United States Patent [19]

Dimitriadis

[11] 4,057,032
[45] Nov. 8, 1977

[54] ANIMAL BATHING APPARATUS

[76] Inventor: James Christ Dimitriadis, 25261 Earhart Road, Laguna Hills, Calif. 92653

[21] Appl. No.: 712,649

[22] Filed: Aug. 9, 1976

[51] Int. Cl.² .............................................. A61D 11/00
[52] U.S. Cl. ...................................... 119/1; 119/158
[58] Field of Search .................. 119/1, 15, 33, 158, 119/160

[56] References Cited

U.S. PATENT DOCUMENTS

| 1,760,017 | 5/1930 | Smoot | 119/158 |
| 2,536,943 | 1/1951 | Kessel | 119/158 |
| 3,749,064 | 7/1973 | Weinstein et al. | 119/158 |
| 3,793,987 | 2/1974 | Rogers | 119/1 |
| 3,985,102 | 10/1976 | Yonezawa | 119/160 |

Primary Examiner—Louis G. Mancene
Assistant Examiner—Robert P. Swiatek
Attorney, Agent, or Firm—Francis X. LoJacono

[57] ABSTRACT

A dog bath apparatus comprising an adjustable frame structure adapted to support a housing cover which forms a somewhat sealed compartment in which various animals, particularly dogs, are positioned to be washed therein, having the head of the animal protruding through an aperture of the forward wall thereof. The frame structure includes a water-spray discharge pipe wherein the frame and the housing cover are received in a bottom drain pan having a discharge port to allow the water therein to be drained while the animal is being washed. Additional access slots are provided through which one can readily reach the animal during the washing operation.

8 Claims, 4 Drawing Figures

ANIMAL BATHING APPARATUS

BACKGROUND OF THE INVENTION

1. Field of the Invention

This invention relates generally to an enclosed washing device, and more particularly to an apparatus for washing animals of various sizes, such as dogs.

2. Description of the Prior Art

As is well known in the art, various problems and difficulties are encountered in providing suitable means for washing animals, particularly dogs. That is animals are generally washed in open tubs which allows for water and soap to be inadvertently sprayed over a large area, as well as wetting the individual performing the washing operation. The animal has a tendency to try to run or jump from the area in which he is being held or positioned. Because of this, very often one must restrain the animal in some haphazard manner which, on occasions, will cause injury to the animal. Also, quite often the animal is frightened by the entire procedure.

In addition, due to these problems a further problem exists in keeping water and soap from getting into the eyes and ears of the animal, and this is particularly difficult when bathing a dog.

Thus, to the applicant's knowledge an apparatus as hereinafter described will solve the above problems and difficulties in bathing most animals.

SUMMARY OF THE INVENTION

The present invention is a bathing apparatus wherein animals of various sizes can be safely bathed or washed without harm to the animal and without messing the surrounding bath area. Accordingly, the bathing apparatus comprises a frame structure having forward and rear adjustable support members which are held in spaced relation to each other by a central, horizontal, discharge spray pipe or conduit. The pipe extends rearwardly and has a threaded end to receive an inlet hose or additional piping as well as the necessary valves. The support members are adjustable in height and are adapted to be received in respective leg members which are positioned within a drain pan.

A housing enclosure is provided and supported by the frame structure wherein the housing includes a rear wall or panel having a zippered opening to allow entry of the animal, a forward wall or panel also having a zippered opening to allow exit from the bathing compartment defined by the housing cover. In addition, an aperture is formed to provide an opening for the animal's head to extend therethrough during bathing thereof. The side walls or panels include horizontal slots for access to the animal during washing and soaping, each slot being covered by a flap so as to prevent leakage of water when not in use. The upper area of the cover has a flap-covered hole whereby a hair dryer or the like can be used while the animal is still confined within the bathing compartment of the housing.

An outlet drain is located within the drain pan wherein the pan also includes a mat or pad to prevent slipping of the animal as it is being bathed.

OBJECTS AND ADVANTAGES OF THE INVENTION

The present invention has for an important object a provision for an apparatus for bathing animals, particularly dogs, so as to protect the animals from harm during the washing thereof and to confine the water and soap within a given area.

It is another object of the invention to provide an animal-bathing apparatus that will accommodate various sizes of animals, wherein the apparatus includes an adjustable frame structure.

It is still another object of the invention to provide an animal bathing apparatus that includes a bathing compartment having easy access openings to reach the animal from all positions when required, and wherein rear and forward panels of the housing have sealable access openings as well.

It is a further object of the invention to provide an apparatus of this character wherein the animal can be bathed, cleaned and dried within the housing so as to restrain the animal in a simple and safe manner during these steps.

It is still a further object of the invention to provide an apparatus of this character that is easy to service and maintain.

Still another object of the invention is to provide an animal-bathing apparatus of this character that is relatively inexpensive to manufacture.

Another object of the present invention is to provide an apparatus of this character that is simple and rugged in construction.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

BRIEF DESCRIPTION OF THE DRAWINGS

Referring more particularly to the accompanying drawing, which are for illustrative purposes only.

DESCRIPTION OF THE PREFERRED EMBODIMENT

Figure 1:
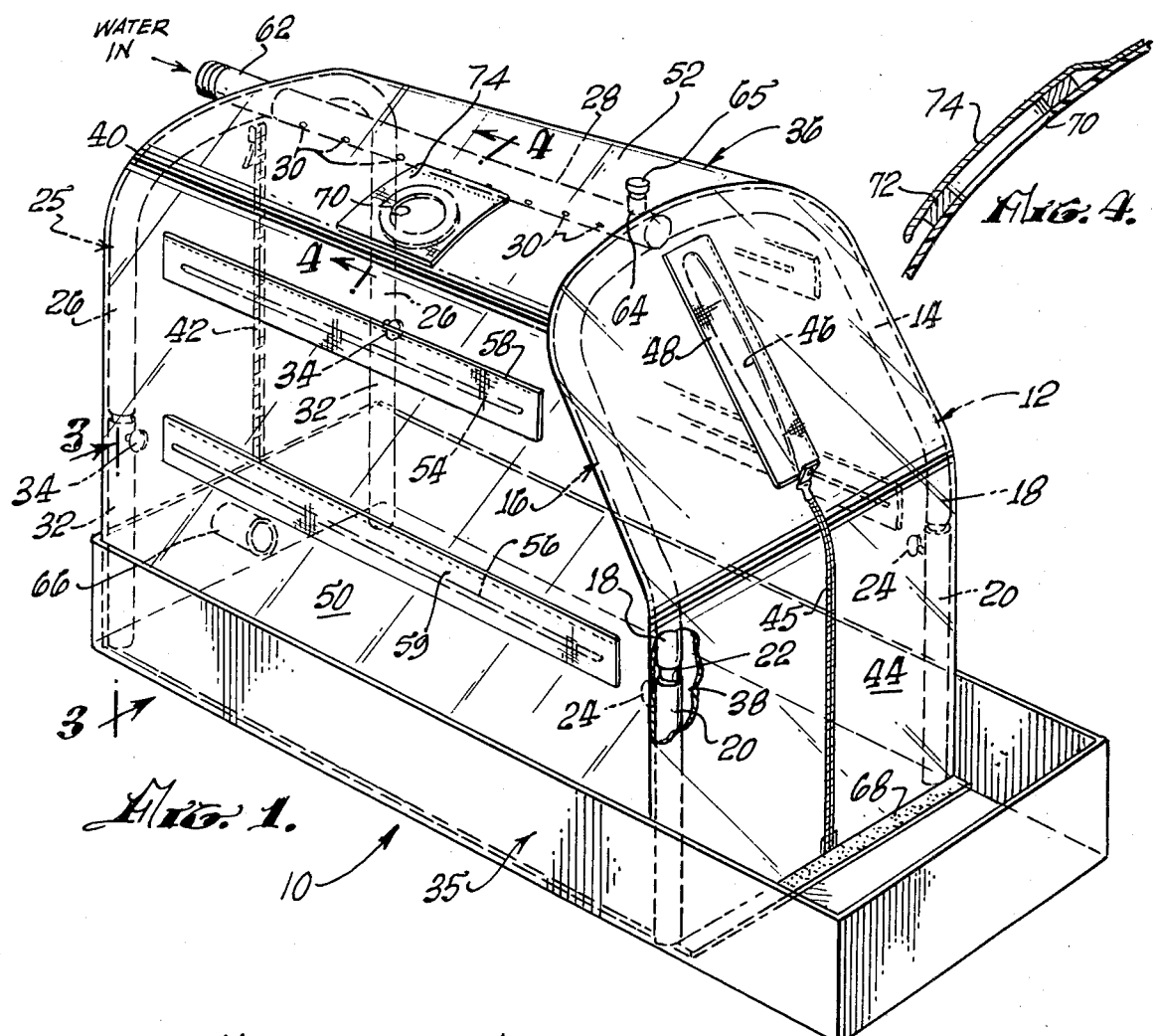
FIG. 1 is a perspective view of the present invention showing the overall construction thereof.

Referring more particularly to FIG. 1, there is shown an animal-bathing apparatus, generally indicated at 10. This apparatus can be used for several types of animals; however, it is specifically designed for small to large dogs. The following description will, therefore, relate to dogs to simplify the presentation and understanding of the invention.

Said animal-bathing apparatus 10 comprises a tubular frame structure designated generally at 12. The frame structure includes a front support strut 14 having a somewhat inverted U-shaped configuration wherein the upper half 16 thereof is bent rearwardly, leaving the lower-extending oppositely disposed arms 18 arranged to be telescopically received in the upwardly extended matching legs members 20. Arms 18 include a reduced diameter portion 22 that is slidably adjustable in said legs, wherein locking means such as thumb screws 24 are mounted to engage said arm portions 22, whereby said front-support strut 12 can be adjusted in height to accommodate various sized dogs. A rear support strut 25 is also included and arranged to be vertically adjusted for height, said rear strut being formed with a substantially inverted U-shaped configuration, except the depending legs 26 are not bent as the front strut; thereby, the rear end of the structure is positioned perpendicularly to the floor.

Connected to and interdisposed between the front and rear struts 14 and 25, respectively, is a conduit or pipe 28, which acts as a water spray means, said pipe being provided with a plurality of small holes 30 through which water is sprayed over the dog to be washed.

It is contemplated that holes similar to holes 30 can also be provided in the strut members which are constructed of elongated tubular members. Thus, the spray of water would cover most of the dog's body.

The rear strut 25 is slidably mounted to oppositely positioned vertical legs 32, which include thumb screws 34.

Figure 3:
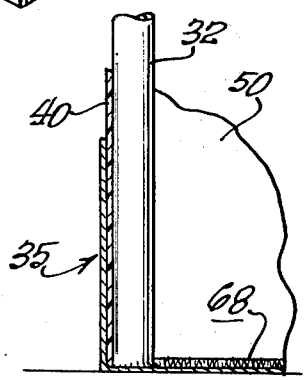
FIG. 3 is an enlarged cross-sectional view taken substantially along line 3—3 of FIG. 1.

When the struts are arranged in their proper position, they are placed within a drain pan, indicated generally at 35, and seen in FIG. 3. Once, the frame structure 12 is in place, a housing cover designated at 36 is superposed over said frame structure; whereby forward, rear, side and top walls or panels are represented, defining a bathing compartment 38 therein in which a dog is positioned where he is to be bathed.

To allow the dog to enter compartment 38, the rear panel 40 is provided with a closure means 42, which is illustrated in FIG. 1 as a zipper extending from the top to bottom of said rear panel. Thus, it can be seen that, when zipper 42 is lowered, an access entrance is provided; and, once the dog is positioned therein, the entrance is again closed by zipper 42.

When the dog or other animal is positioned in compartment 38, the animal's head is arranged to extend through the forward panel 44; that is, there is a slotted opening 46 cut in the upper area of panel 44 which is also formed to fit the bent support strut 14. Said opening 46 is generally covered when not in use by flap 48 which comprises the same clear plastic material from which the housing cover is made, the flap being secured to panel 44 along one edge thereof in any suitable well-known manner. A front panel 44 also includes a zipper sealing means 45. Thus, when the dog is ready to be taken from the compartment 38, zipper 45 is opened, thereby providing an enlarged exit opening through which the dog can freely pass.

Figure 2:
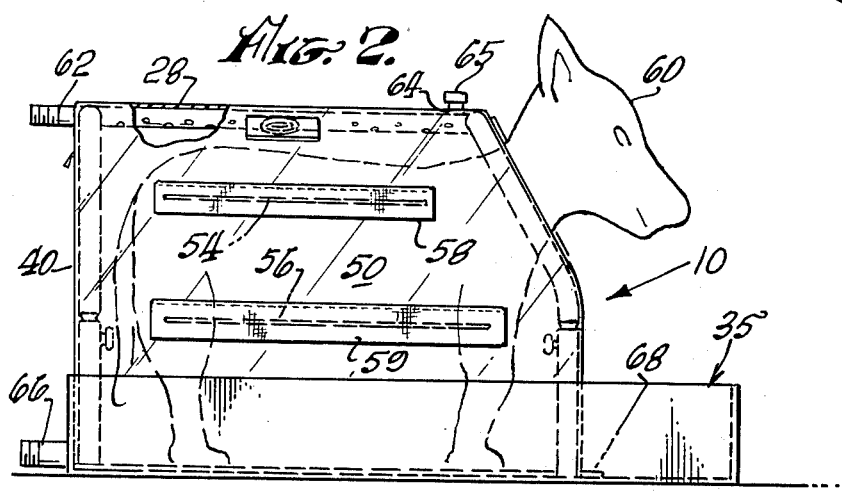
FIG. 2 is a side-elevational view thereof illustrating an animal disposed within the bathing compartment of the structure.

The side panels or walls 50 are integrally formed and connected by top panel 52. Each side panel includes at least two horizontal slots 54 and 56, wherein each slot is provided with respective flap covers 58 and 59. These slots allow access into bathing compartment 38 during bathing for soaping and rinsing the animal. See FIG. 2 for illustration of the dog 60 as it is located within the apparatus.

Hence, when the dog is so positioned water is allowed to flow into pipe 28 by means of the threaded pipe coupling extension 62.

Various methods of connecting the water supply can be used, such as a water hose or additional pipes and control valves, which are not shown as they are not part of the invention.

It should be noted that a forward outlet means defined by nipple 64 and cap 65 can be provided to allow external spray devices to be attached, if necessary. Various attachments are contemplated whereby the dog's face and head can be bathed as well. Thus, a drain means is included comprising drain pan 35 having a drain outlet 66 through which water is discharged from the collecting drain pan 35. Said outlet 66 can also be connected to various well known drain elements.

To provide sure footing for the animal, a non-slip mat 68 is arranged to cover the bottom of the drain 35.

Figure 4:
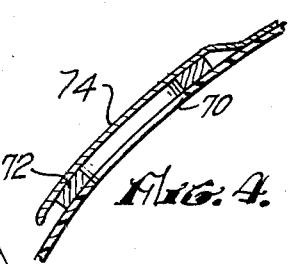
FIG. 4 is an enlarged cross-sectional view taken along line 4—4 of FIG. 1.

After the dog is bathed and rinsed, it must be dried. Thus, a means to allow a well known hair dryer is formed in the top of the housing. This means comprises an annular aperture 70 of sufficient size to allow access for the general hair dryer. A support band 72 is secured around aperture 70 wherein both are covered by a flap 74, as seen in FIGS. 1 and 4.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. An animal-bathing apparatus comprising:
   an adjustable, tubular, frame structure having front and rear support strut members;
   a liquid-impervious housing cover of a flexible material defining a bathing compartment having access openings therein, and a rear entrance and a forward exit opening;
   means for sealing said openings, said entrance, and said exit openings when not in use, said means being affixed to said housing cover;
   water spray means disposed within said compartment and located between said strut members therein; and
   drainage means formed to receive said frame structure and said housing therein, whereby said water is drained from said compartment of said housing cover; and
   wherein said front-support strut comprises:
   an upper tubular portion having a substantially inverted U-shaped configuration with depending arm members, said upper portion being bent rearwardly therefrom;
   a pair of forward leg members arranged to slidably receive said arm members of the front support strut; and
   locking means mounted to said leg member, whereby said upper portion is locked in a predetermined height; and wherein said rear-support strut comprises:
   an upper tubular portion having a substantially inverted U-shaped configuration with depending arm members;
   a pair of rearward leg members arranged to slidably receive said depending arm members; and
   locking means mounted to said leg members, whereby said upper portion thereof is locked in a predetermined height.

2. An animal-bathing apparatus as recited in claim 1, wherein said housing cover comprises;
   a front wall wherein said exit opening is disposed;
   a rear wall wherein said entrance opening is disposed;

side walls having said access openings formed therein, said access opening defined by elongated horizontal slots.

3. An animal bathing apparatus as recited in claim 2, wherein said front wall includes an aperture to receive the head of an animal therethrough while said animal is being washed in said compartment.

4. An animal-bathing apparatus as recited in claim having wherein said means for sealing said entrance and said exit openings comprises a vertically disposed zipper, and wherein said sealing means for said slotted openings comprises an overlapping flap member secured to said housing cover.

5. An animal-bathing apparatus as recited in claim 4, wherein said water spray means comprises a horizontal conduit positioned between said support struts along the upper portion of the structure, said conduit having a plurality of discharge holes disposed therein, thereby allowing water to spray over the animal's body when restrained in said compartment, said spray means including coupling means extending outwardly from said conduit whereby a water supply is operably interconnected thereto.

6. An animal-bathing apparatus as recited in claim 5, wherein said housing cover includes an aperture disposed adjacent the top wall thereof having a flap closure secured to said wall, said aperture being arranged to receive a hair dryer therethrough.

7. An animal-bathing apparatus as recited in claim 5, wherein said drainage means comprises a pan wherein said frame structure and said housing cover are positioned therein to allow water therefrom to be caught within said pan, and a discharge drain outlet secured to said pan.

8. An animal-bathing apparatus as recited in claim 7, wherein said spray means includes an outlet means arranged to be externally exposed and secured to said conduit, whereby various spray elements can be attached thereto.

* * * * *